United States Patent [19]
Sotiropoulos et al.

[11] 3,878,984
[45] Apr. 22, 1975

[54] DIMENSION-MEASURING APPARATUS AND METHOD

[75] Inventors: Hippocrates Sotiropoulos, Media; Euripedes Tsaprazis, Upper Darby, both of Pa.

[73] Assignee: Olympic Metronics, Inc., Delaware, Pa.

[22] Filed: Dec. 19, 1973

[21] Appl. No.: 426,013

[52] U.S. Cl......... 235/151.32; 33/172 E; 33/174 Q; 235/151.3; 235/92 MT; 235/92 DN; 324/103 P
[51] Int. Cl. .............................................. G01b 7/12
[58] Field of Search....... 235/151.3, 151.31, 151.32, 235/92 BD, 92 CA, 92 DN, 92 MT; 33/169 R, 172 E, 174 Q; 324/99 D, 103 R, 103 P

[56] References Cited
UNITED STATES PATENTS

| | | | |
|---|---|---|---|
| 2,987,825 | 6/1961 | Torn et al. ...................... | 33/172 E |
| 3,012,195 | 12/1961 | Slocomb et al .................. | 324/103 P |
| 3,056,208 | 10/1962 | Murtland et al. .............. | 235/92 DN |
| 3,180,031 | 4/1965 | Roeger et al. ................... | 33/174 Q |
| 3,187,303 | 6/1965 | Chiapuzio et al. .............. | 324/103 R |
| 3,371,419 | 3/1968 | Banks et al. ..................... | 33/174 Q |
| 3,593,133 | 7/1971 | Wisner ............................. | 324/103 R |
| 3,600,565 | 8/1971 | Forbes ............................. | 324/103 P |
| 3,665,506 | 5/1972 | Sanford ........................... | 324/103 P |

OTHER PUBLICATIONS

Hewlett-Packard Co., hp 405A Digital Voltmeter, 1958.

*Primary Examiner*—Felix D. Gruber
*Attorney, Agent, or Firm*—Howson and Howson

[57] ABSTRACT

The true diameter of a cylinder or sphere is measured and automatically displayed as a digital number. The object to be measured is rolled beneath the tip of a downwardly spring-biased transducer so that the transducer assumes a vertical position indicative of the thickness of the portion of the object beneath it. The transducer output signals are converted to digital form and applied to a digital display device. Electronic circuit means sense when a maximum thickness-representing number is presented, and cause this number to be retained on the display for observation; this maximum number represents the diameter to be measured. Means are also provided for discontinuing the holding of the displayed maximum number automatically at the end of an operator-set hold time, and other means are provided whereby the maximum number may instead be held indefinitely until a manually-operable push-button is actuated to release the holding action; the number-holding function may also be entirely disabled manually, to permit the output display to display all thickness values, if desired. Preferably the automatic holding of the maximum number is accomplished by comparing each dimension-representing number with the immediately subsequent one, and displaying the subsequent number only if it is greater than the preceding one. The minimum value of a dimension, rather than the maximum value, may also be sensed, presented and held in the same manner. Thicknesses of other objects, such as flat plates, may also be measured, and the thickness may be measured by devices which do not actually contact the surface of the object being measured.

6 Claims, 4 Drawing Figures

DIMENSION-MEASURING APPARATUS AND METHOD

BACKGROUND OF THE INVENTION

This invention relates to method and apparatus for sensing and indicating extreme values of the dimension of an object.

There are many applications in which it is desirable to measure and present clearly and accurately an indication of an extreme dimension of an object. For example, it may be desired to measure and display accurately the true diameter of a cylindrical roller bearing, the true diameter being the maximum transverse thickness of the bearing. It is also desirable in some cases to measure a diameter of a ball bearing, or to measure a number of diameters to check that the diameter is uniform and the ball spherical. In other cases it may be desired to measure accurately the thickness of different portions of a flat plate. In some cases, it may be desired to determine the minimum dimension of an object, for example the thickness of an object at the bottom of an annular ring formed therein. Many other applications will occur to one skilled in the art in which it is desirable to measure accurately, and to display, a dimension along a given axis, and particularly to measure and display an extreme value thereof, such as a maximum or minimum thickness.

Many ways of measuring object dimensions are known in the prior art. Besides the obvious mechanical expedient of measuring each dimension manually as with calipers or the like, dimension-sensing equipment is known which will sense the dimension along a given axis of an object adjacent thereto and produce output electrical signals indicating the value of this dimension. One such device comprises a slidable transducer element spring-biased downwardly toward the object to be measured, so that the lower tip of the transducer element rides on the surface of the object and therefore moves up and down in accordance with the dimension being measured at the time. The electrical output of the device can be supplied to a meter which will provide a visual indication of the dimension at any given time. Thus, for example, to measure the diameter of a roller bearing, it is possible to roll such a bearing beneath the transducer tip while observing the meter reading to determine its maximum indication, which will represent the diameter of the cylindrical roller bearing.

A major difficulty with such apparatus is that it conduces to inaccuracy and delay in making the measurement, especially in the hands of an unskilled operator. For example, to determine when the maximum reading of diameter of a roller bearing is being produced, the operator will usually find it necessary to turn the bearing back and forth near the position of the maximum reading in an attempt to determine what the peak value actually is. It is obviously difficult to do this with high accuracy, and the results depend in substantial part upon the skill and patience of the operator. In addition, such a measurement is obviously quite time consuming. The same is true if the dimensional extreme to be measured is a minimum, as may occur in measuring the remaining thickness of a body beneath a depression formed in an object.

It is therefore an object of the invention to provide new and useful apparatus and method for measuring and indicating a dimension of an object.

Another object is to provide such method and apparatus which is accurate and reliable, and quick and easy to use.

A further object is to provide such method and apparatus which will measure and indicate an extreme dimension of an object, in a manner which is accurate, quick and does not require substantial operator skill.

SUMMARY OF THE INVENTION

These and other objects of the invention are achieved by the provision of apparatus for indicating an extreme value of a dimension of an object, comprising means for scanning at least a portion of said object with a dimension-measuring device to produce output signals representative of the values of said dimension as said portion of said object is being scanned, and electrical circuit means responsive to said signals to produce and retain a digital display of an extreme number representing an extreme value of said dimension.

Preferably the dimension-scanning means comprises means for producing analog signals representative of the dimension, and preferably the electrical circuit means comprises analog-to-digital converter means responsive to the analog signals to convert them to binary digital signals, as well as digital display means controlledly responsive to these binary digital signals to display digitally the number which they represent; in addition, there are preferably employed means responsive to a change in the binary digital signals in the direction corresponding to reductions of the measured value from its extreme value, for causing the digital display means to retain display of the number representing the extreme value.

In various preferred forms of the invention, adjustable hold means are provided for manually selecting the time interval for which the number representing the extreme value is automatically retained; manually-operable push-button means may also be employed for terminating the retention of the extreme number when the push-button means is operated at the will of the operator. Also preferably employed is a mode switch which can be set to a position for which the automatic hold function is operative, or for which the manually-operable push-button means is operative, or in which neither is operative and the number displayed will follow the dimension-representing signals for either direction of change of dimension. In one preferred form, the scanning means for measuring the dimension comprises electromechanical transducer means having a slidable element spring-biased to bear against the surface of a specimen a dimension of which is to be measured, this transducer means producing output electrical signals in proportion to the position of the slidable element.

Using such apparatus, an extreme dimension such as the diameter of an object having a circular cross-section is readily measured, and displayed in digital form for a desired time interval, by merely moving (e.g. rolling) the object beneath the dimension-sensing apparatus so that the maximum dimension corresponding to the diameter passes through the measurement axis, the system then functioning to display and retain a number representing this maximum dimension in digital form.

Accordingly, an unskilled operator, by merely moving the object to be measured through the axis of the measuring station, is provided with an unambiguous, accurate, digital display retained sufficiently long for him to read it accurately and representing the maximum dimension, in this case the diameter.

BRIEF DESCRIPTION OF FIGURES

These and other objects and features of the invention will be more readily understood from a consideration of the following detailed description of a representative embodiment, taken in connection with the accompanying drawings, in which.

DETAILED DESCRIPTION OF SPECIFIC EMBODIMENTS

Without thereby in any way limiting the generality of the invention, there will now be described, by way of example only, one form of its embodiment which has been found to be of practical utility in certain applications.

Figure 1:
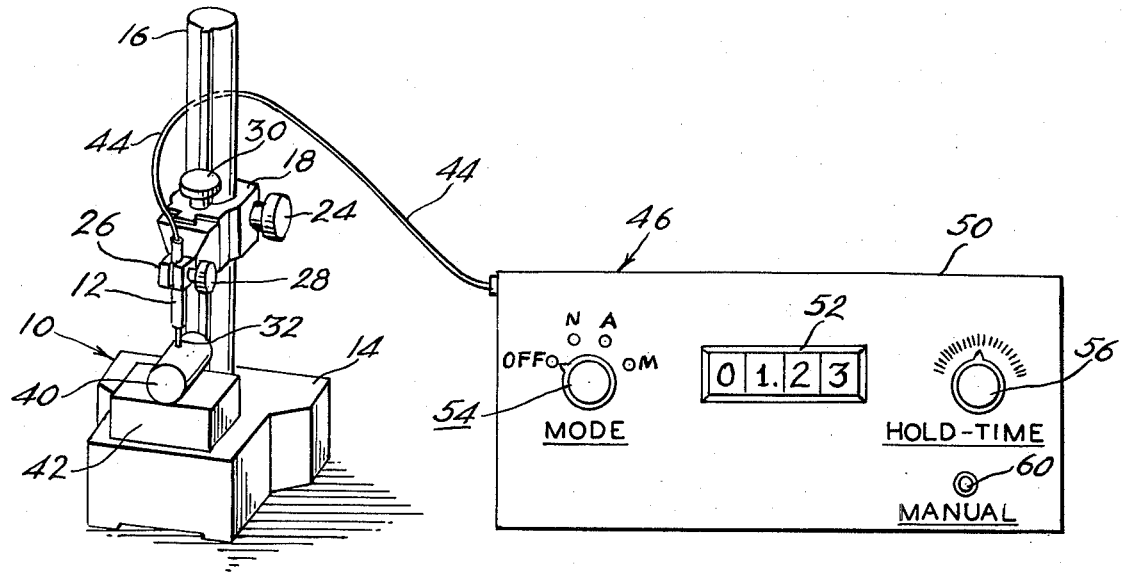
FIG. 1 is a perspective view of a system employing a dimension-sensing stand and associated electronic unit in accordance with one embodiment of the invention.

FIG. 1 illustrates one possible packaging arrangement for the physical elements of the system. A stand 10 is provided for holding a transducer cartridge 12 in a vertical position, as shown. The stand may comprise a base 14 supporting an upright cylindrical column 16 on which a clamp 18 is adapted to slide vertically when the clamping screw 24 is loosened. In use, the clamp 18 is slid manually to approximately the desired height, and the clamping screw 24 is then tightened. The transducer cartridge is clamped between the jaws 26 by tightening of the screw 28, and the fine vertical position of the jaws and transducer with respect to the clamp is adjustable by means of a low-backlash adjustment operated in response to turning of the vertical adjustment screw 30.

The transducer cartridge 12 comprises a vertically-slidable probe 32, having a fine point at its lower end and spring-biased downwardly. The pointed end of probe 32 is adapted to contact the adjacent surface of the object whose thickness is to be measured, in this case represented as a roller bearing 40 positioned on a measuring block 42 having a hard plane upper surface disposed horizontally.

The transducer cartridge 12 may be of a known, commercially-available type which, when supplied through cable 44 from electronics unit 46 with an appropriate fixed frequency electrical oscillation, returns to unit 46 an oscillation of the same frequency amplitude-modulated in proportion to the linear vertical displacement of the probe 32 from a reference zero position. In the present example, it will be assumed that the amplitude modulation is set to zero when the lower tip of the probe 32 is positioned above the measuring block 42 by the intended nominal thickness of the pieces to be measured. For example, if the roller bearing 40 is intended to have a diameter of ½ inch, a test block of exactly ½ inch thickness is placed on the measuring block 42, and the vertical positon of transducer cartridge 12 adjusted to produce zero-amplitude modulation at this time; if desired, an appropriate electronic zeroing circuit is included in the electronics unit 46.

Electronics unit 46 is provided at the front of its case 50 with a digital display 52, which in this example displays the decimal number 01.23. This number indicates that the roller bearing 40 has a thickness under the probe point which exceeds ½ inch by 1.23 thousandths of an inch; thus the least significant digit in this example represents 0.00001 inch. Also in this embodiment, the most significant digit, (zero in the example of FIG. 1) can only be zero or a one, so that the largest reading which can be produced in 19.99, or 0.0199 inch. If the thickness of the roller is less than the standard ½ inch, the number displayed in the digital display will be preceded by a minus sign.

Also provided on the front of the case 50 is a mode switch 54 having four different positions, namely, off, normal, automatic and manual. In the off position, the entire unit is turned off. In the normal positon, the digital display will show the instantaneous deviation from standard thickness in either direction as the probe moves upwardly or downwardly in contacting different portions of the specimen of different thickness. In the automatic position, the display will show the largest thickness value encountered during the measurement and will hold this value, even if the thickness measurement thereafter decreases, for a fixed period of time determined by the adjustment of the hold-time control 56 on the front of case 50. Typical hold times are of the order of from one to seven seconds. This important feature enables an operator on the production line, for example, to roll a roller bearing under the probe 32 and thereby cause the deviation from standard of the diameter of the roller bearing to be displayed in unambiguous digital form on the front of the electronics unit; this digital number will remain in the display for an adequate time for its accurate observation, and is then automatically removed. With the mode switch in the manual position, the maximum or peak dimensional measurement is again retained, but in this case it does not disappear automatically but instead remains in the display until the manual pushbutton 60 is operated by the operator; this permits retention of the reading for as long as is desired, without its being automatically removed. However, while the manual push-button 60 is being operated, the equipment reverts to the normal mode of operation in which the number in the display follows the position of the probe regardless of the sense of its motion; this mode of operation continues so long as the push-button remains operated, and the equipment reverts to the peak-reading type of operation when the push-button is released.

Figure 2:
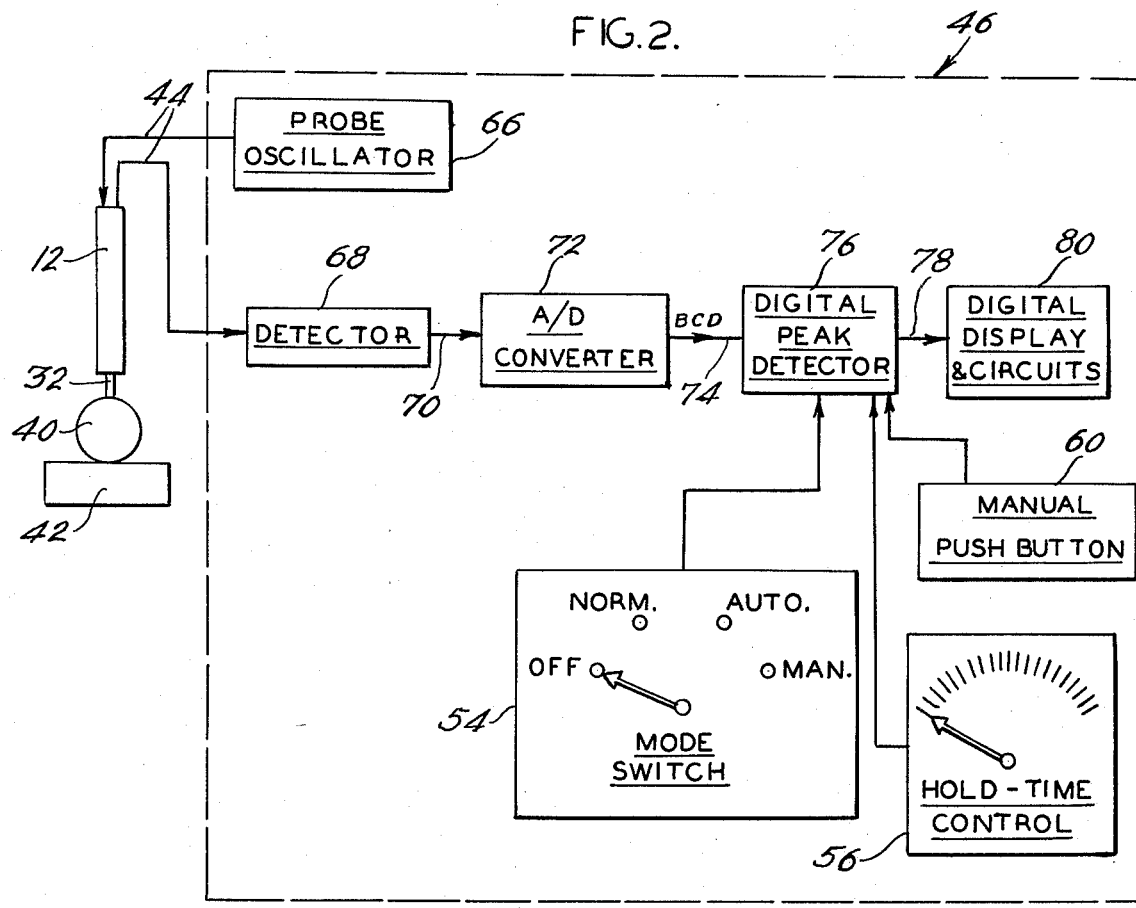
FIG. 2 is a block diagram illustrating further details of the electronic unit of FIG. 1.

FIG. 2 illustrates the general nature of the system in broad block form. Numerals corresponding to those of FIG. 1 represent corresponding parts. FIG. 2 shows a probe oscillator 66 feeding suitable oscillations, such as five kilocycle-per-second oscillations, to the probe 32, the output of the probe being fed to an amplitude detector 68 which detects the envelope modulation and produces an analog output on lead 70, the level and polarity of which represents the deviation in the thickness of the specimen 40 from the standard thickness. The latter signal is supplied through an analog-to-digital converter 72 which converts the signal into binary coded decimal (BCD) signals representing four decimal digits. The latter BCD signal on lead 74 is supplied to a digital peak detector 76 the output of which is supplied over lead 78 to the digital display and circuits 80. The operation of the digital peak detector 76 is controlled by the mode switch 54, the hold-time control 56 and the manual push-button 60; when the mode switch is in the normal position, the peak detecting portion of the peak detector 76 is effectively bypassed so that the BCD signals are supplied to the digital display and circuits 80 regardless of the sense of the change in the position of probe 32. In the automatic positon of the mode switch, the peak detector acts to change the digital display as long as the number represented thereby is increasing, corresponding to an increase in specimen thickness; when the measured thickness decreases, the displayed number remains at the previous maximum value for a time determined by the setting of the hold-time control 56. In the manual position of the mode switch, the maximum number on the digital display is held indefinitely until the manual push-button 60 is operated to permit the display to follow both increasing and decreasing numbers, and when the push-button is released the equipment reverts to the type of operation in which the maximum number is held in the display until the push-button is again operated.

Figure 3:
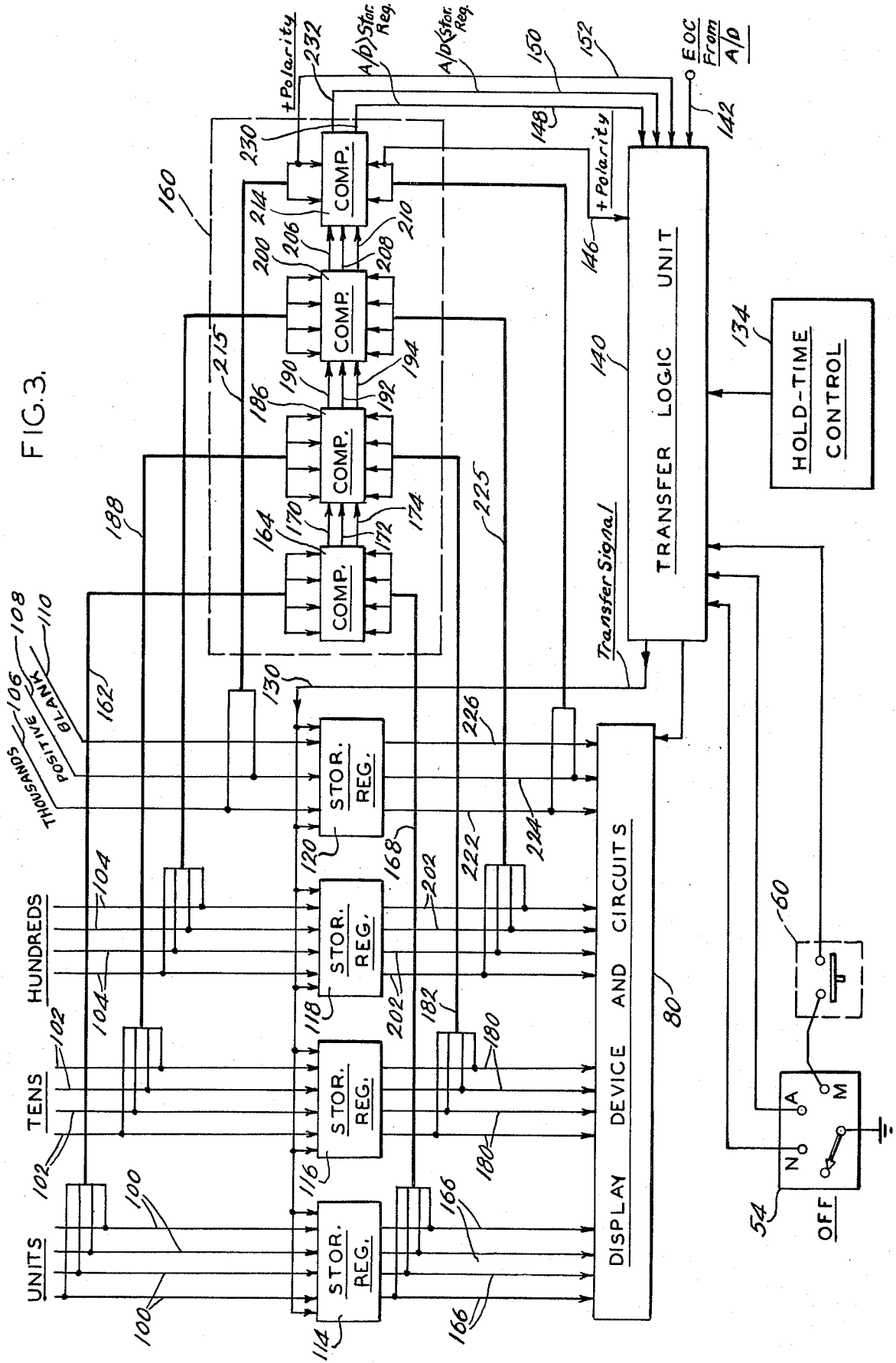
FIG. 3 is a functional block diagram illustrating that portion of the electronic unit which follows the analog-to-digital converter.

Referring to FIG. 3, there is shown in more detail the portions of the electronic circuitry following the analog-to-digital converter 72. The signals supplied over line 74 in FIG. 2 are carried on the three sets of four wires and the one set of three wires shown at the upper left of FIG. 3. More particularly, the four wires 100 labeled "units" carry four bits of binary information representing the least significant decimal digit of the numbers from the A/D converter; the next four wires 102, labeled "tens", carry the four bits of binary information representing the next more significant decimal digit; and the next four wires labeled "hundreds" carry the four binary bits representing the next more significant digit. In the next group of three input wires, the wire 106 labeled "thousands" represents the most significant digit, which however can only be either zero or one, since only one bit is carried by the wire. The wire 108 labeled "positive" has a particular level, for example a "high", when the number to be represented is positive indicating that the specimen thickness is above the standard value; when the specimen thickness is below the standard value, line 108 will have its opposite extreme level, or a low. The wire 110 labeled "blank" carries a signal, preferably also generated in the A/D converter, which is produced if the thickness of the specimen is beyond the representable number range, i.e., beyond ± 19.99. This signal is used, as described herein later, to blank the display device and remove all numbers therefrom in the event that the specimen thickness is beyond the range of the system.

The units-representing information on lines 100 is supplied as input to storage register 114, the tens information on lines 102 is supplied as input to storage register 116, and the hundreds information on lines 104 is supplied as input to storage register 118; the thousands information and the "positive" and "blank" information on lines 106, 108 and 110 respectively are supplied as input to storage register 120. Each storage register may be of known type which momentarily stores the number information supplied thereto, as by the setting of a corresponding set of electronic-latching circuits therein, and transfers this number information to the display device and circuits 80 only upon the occurrence of a transfer signal supplied to each of them over transfer signal line 130.

In the general operation of the system, the transfer signal is a high on line 130. When the mode switch 54 is in its normal position such a transfer signal will be supplied for all numbers within the range of the equipment, and all of these numbers will be transferred to the display device, whether the numbers are increasing or decreasing. When the mode switch is in the automatic position, all such numbers are transferred to the display device by means of the transfer signal so long as the numbers represent increases in specimen thickness, but as soon as a decrease in specimen thickness is detected the transfer signal is suppressed for a predetermined interval of time determined by the adjustment of the adjustable timer and hold circuit 134, so that the peak reading is held on the display device for this period of hold time. In the manual mode, the largest thickness-representing number is presented and held until the push-button 60 is operated, as which times the sytem will operate in the previously-described normal mode.

These various functions are produced by means of the transfer logic unit 140, supplied at one of its input lines 143 with an EOC (end of conversion) pulse produced by the A/D converter circuitry each time the analog information has been converted into BCD number information and is supplied to the storage registers. The transfer logic unit 140, in effect, controls the times at which the EOC pulse signal on line 142 causes a transfer signal to occur on line 130 to transfer to the display device the number information supplied to the storage registers. To accomplish this, transfer logic unit 140 is supplied with signals from the mode switch 54, the push-button 60, the adjustable timer and hold circuit 134 and, in addition, is supplied with four other control input signals on lines 146, 148, 150 and 152, as described hereinafter.

A comparator arrangement 160 is provided for comparing each of the signals transferred out of the storage registers for a given number (except for the blank signal) with the corresponding input signals to the storage registers for the next subsequent number from the A/D converter. More particularly, the four units input leads 100 are separately connected over cable 162 to one input section of comparator 164, and the output leads 166 supplying output signals from storage register 114 to display device and circuits 80 are connected over cable 168 to the other set of input terminals of comparator 164. The output signals from storage register 114 are compared in comparator 164 with the input signals on input leads 100, and comparator 164 produces three respective outout signals on its output leads 170, 172 and 174. A high on one of these lines 170 indicates that the units digit of the new input number from the A/D converter is greater than that of the immediately-preceding number in the display device; a high on line 172 indicates that the unit digits of these two numbers are equal; and a high on line 174 indicates that the units number from the A/D converter is smaller than that previously transferred out of the shift register 114.

Similarly, the BCD information on output lines 180 from storage register 116 is supplied over cable 182 to the lower set of four input terminals of comparator 186, the upper four input terminals of which are supplied over cable 188 from the tens input lines 102 of storage register 116. Output lines 190, 192 and 194 from comparator 186 then carry information, respectively, as to whether the units and tens digit of the numbers from the A/D converter combined are greater than, equal to, or less than the combination of the units and tens digits transferred to the display device by storage registers 114 and 116.

Similarly, comparator 200 is supplied not only with the three outputs from comparator 186, but with the hundreds information from the A/D converter appearing on input lines 104 to storage register 118, and with the hundreds information in the display and appearing on storage register output lines 202 during transfer of the hundreds information into the display device. Output lines 206, 208 and 210 then provide information respectively indicative of whether the number represented by the units, tens and hundreds digits from the A/D converter is greater than, equal to, or less than the corresponding number in the display.

The next comparator 214 is supplied not only with the three outputs from comparator 200, but is also supplied over cable 215 at one set of input terminals with the thousands information from the A/D converter appearing on register input line 106 and with the positive information appearing on register input line 108. Comparator 214 is also supplied with the corresponding thousands and positive information as to the number transferred to the display, by way of output lines 222 and 224 of storage register 120 and cable 225. The information on the blank input line 108 to storage register 120 is not supplied to the comparators, but is transferred over line 226 at the appropriate time directly to the display device and circuits 80 to blank them if the input number from the A/D converter exceeds the maximum range of the circuit, in this example 19.99. The positive signal on line 224 is supplied to the display device and circuits 80 to control whether or not the negative sign should be displayed in front of the number in the display.

Comparator 214 is also supplied with the positive line information from input line 108 and from output line 224 of storage register 120 as mentioned above, for the reason that the comparator 214 is intended to produce an output which represents the relation between the algebraic values of the number from the A/D converter and the number in the display. That is, if the number from the A/D converter, is a +2, and the number on the display is a −5, comparator 214 will determine that the number +2 is more positive and represents a greater specimen thickness than the number −5 even though the absolute value of −5 is greater than that of +2.

Accordingly, output line 230 of comparator 214 provides a signal, such as a high, indicative of the fact that the complete new number being received by the storage register from the A/D converter is algebraically greater than the number transferred immediately previously from the storage registers to the display device; comparator output line 232 provides a signal, such as a high, when the number from the A/D converter is algebraically less than that supplied from the storage register to the display device. Thus when successive numbers from the A/D converter are increasing in algebraic value, output line 232 will have a signal such as a high thereon and comparator output line 230 will not; conversely, when the algebraic value of the new number from the A/D converter is less than the previous number supplied to the display device, line 230 will have a signal such as a high thereon, and line 232 will not. If the new number and the immediately preceding one are equal, neither of the output lines 230 or 232 will have a signal thereon, since in this event no action need be taken with respect to the number displayed.

It will therefore be appreciated that comparator apparatus 160 accomplishes a comparison of the algebraic values of each new number from the A/D converter with the number previously transferred from the storage registers to the display device to provide two output signals respectively indicative of whether the new number from the A/D converter corresponds to a greater thickness of specimen or to a smaller thickness. These signals, supplied over the leads 150 and 152 to the transfer logic unit 140 indicate when a peak value of specimen thickness has occurred. The manner in which these signals, together with the positive polarity signals on lines 146 and 152 and the EOC signal on line 142, provide the desired functions will now be described with particular reference to FIG. 4, which shows in more detail the nature of the transfer unit 140 and the hold-time control 134.

Figure 4:
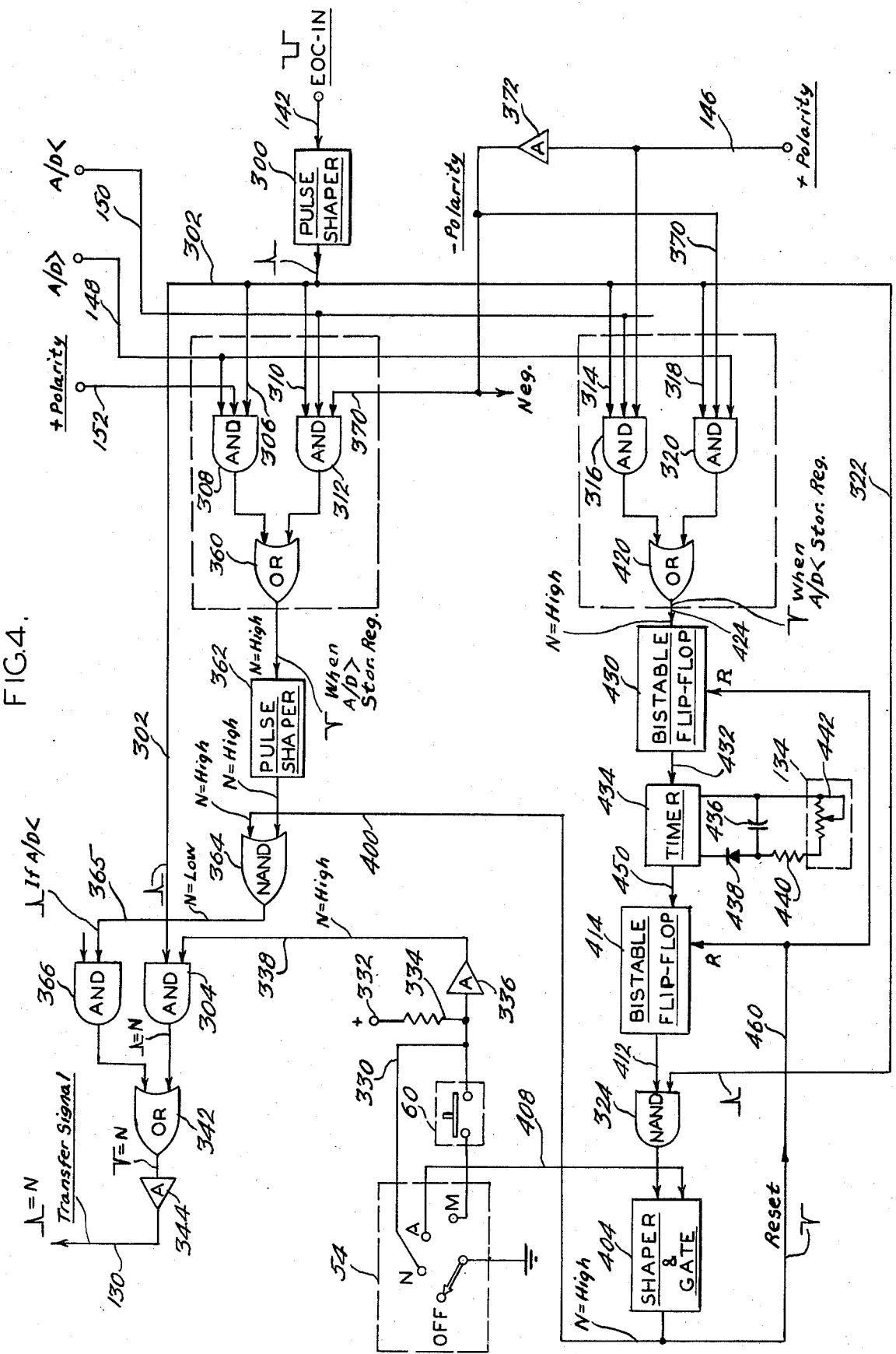
FIG. 4 is a functional block diagram illustrating in further detail the nature of the transfer logic unit of FIG. 3 and its connection to the mode switch, manual push-button and hold-time control of FIG. 3.

Referring then particularly to FIG. 4, the EOC pulse on line 142, here assumed to be negative, is preferably passed through a pulse shaper 300 to produce a narrow positive EOC pulse which is delivered over line 302 to one input of AND circuit 304, over input line 306 to one input of AND gate 308, over line 310 to one input of AND gate 312, over line 314 to one input of AND gate 316, over line 318 to one input of AND gate 320, and over line 322 to one input of AND gate 324. Whenever any of these EOC pulses is effective to cause the transfer signal line 130 to go high, a new number from the A/D converter will be transferred into the display device; at any other times, no such transfer occurs and the number in the display device remains the same. Thus the number-holding operation which is one feature of the invention is accomplished in this case by preventing the EOC pulse from producing a transfer signal, so that the same number remains in the display device and in the comparators.

Considering first the case in which the mode switch 54 is in the normal position for which its contact N is grounded, the effect of such grounding is to cause contact N and its control line 330 to assume ground potential (a low) rather than the positive potential (high) otherwise supplied thereto from the positive bias source 332 by way of resistor 334. The signal on line 330 is passed through inverting amplifier 336, so that the above-described low on line 330 causes input line 338 to AND gate 304 to go high. Under these circumstances, each EOC pulse delivered over input line 302 to the AND gate 304 will pass through the AND gate, then through the OR gate 342 and the inverting amplifier 344 to produce a positive transfer pulse on line 130. Since the EOC pulse occurs for every number, it will produce a transfer pulse for every number, and every number will therefore be transferred into the display regardless of the value of the preceding number, thereby providing the above-described normal operation. In this mode the lower input to the AND gate 366 is low for reasons discussed hereinafter, so that AND gate 366 does not then pass any pulses and does not affect the above-described normal operations.

AND gate 308 is supplied at its three input terminals with the + polarity signal on line 152, with the "A/D greater than storage registers" signal on line 148, and with the narrow EOC pulses on line 306. AND gate 312 is supplied at its three input terminals with the A/D less than storage registers signal on line 150, with the narrow EOC pulses on line 310, and with a "— polarity" signal on line 370 derived by passing the + polarity signal on line 146 through an inverter 372. The outputs of the two AND gates 308 and 312 are supplied to the two input terminals of an OR gate 360.

The combination of AND gates 308 and 312 and OR gate 360 will be understood to have the following logic characteristics: production of a low at the output of OR gate 360 requires that either all three inputs to AND gate 308 be high or all three inputs to AND gate 312 be high; to produce a high at the output of OR gate 360, each of AND gates 308 and 312 must have at least one low input.

In the case in which a new number from the A/D converter is the same as the number then being displayed, both of input lines 148 and 150 will be low and therefore the output of OR gate 360 is high and acts through shaper 362 to supply a high to one input terminal of NAND gate 364; the other input to NAND gate 364 on line 400 is in its normal high state, so that the output of NAND gate 364 supplied to one input of AND gate 366 is a low. Accordingly, the output of OR gate 342 is high, the output of inverting amplifier 344 is low, and no transfer signal is produced on line 130. The displayed number therefore does not change, which is appropriate since the new number is the same as the displayed number.

When the new number from the A/D converter is algebraically larger than the preceding number then in the storage register and being displayed, corresponding to a larger specimen dimension, then either lines 152 and 148 into AND gate 308 will be high or else lines 150 and 370 into AND gate 312 will be high, depending on whether the number is positive or negative. Accordingly the EOC pulse will act through either AND gate 308 or AND gate 312 to produce a negative-going EOC pulse at the output of OR gate 360. This negative-going EOC pulse is applied through shaper 362 to one input of NAND gate 364, to produce at its output a positive-going EOC pulse which is applied over line 365 to one input terminal of AND gate 366; the other input terminal of AND gate 366 is floating and hence acts as a high input, so that the EOC pulse on line 365 operates AND gate 366 and acts through OR gate 342 and mounting amplifier 344 to produce a transfer pulse on transfer line 130.

Still considering the manual mode, when the new number from the A/D converter is algebraically smaller than the preceding number then being displayed, then at least one input to each of the AND gates 308 and 312 will be low and therefore no EOC pulse will appear at the output of OR gate 360 and no transfer pulse will be produced. The display device will therefore continue to hold the display of the last number produced just prior to the decrease in number value, this displayed last number therefore representing a maximum in specimen thickness.

If now the push-button 60 is operated, with the mode switch still in the manual mode, operating conditions will become the same as for the normal mode in that AND gate 304 will be rendered transmissive by a high on line 338, so that every EOC pulse will then produce a transfer signal on line 130. So long as the push-button 60 remains operated, the number on the display device will therefore follow the thickness measurement in either polarity of change. This releases the holding of the maximum number in the display, and when the push-button 60 is released the apparatus will display and hold a new maximum. By way of example, by rolling a roller bearing completely through the thickness-sensing position with the mode switch in the manual position, a number representing the maximum thickness will be displayed and retained for accurate reading even by unskilled personnel. After the reading, the operator will press the push-button 60, and since no bearing is present the sensor will sense an extreme negative resulting in a blanking of the display preparing it for the next reading of maximum thickness of the next bearing.

During the normal and manual modes of operation just described, the input to NAND gate 364 on line 400 from shaper and gate 404 is high, due to the fact that input line 408 to shaper and gate 404 is floating; this condition also prevents shaper and gate 404 from following the output of NAND gate 324. However, when the mode switch is thrown to the automatic position, line 408 is thereby grounded, and this enables shaper and gate 404 to follow the output of NAND gate 324. In this mode switch position, input line 338 to AND gate 304 remains low, so that no transfer pulse can be produced by way of this AND gate. Transfer pulses can only be produced on line 130 by a positive pulse on input line 365 to AND gate 366, which in turn occurs only when a negative-going pulse appears on one of the input lines to NAND gate 364. When the numbers from the A/D converter are increasing in value, the combination of AND gate 308 and 312, OR gate 360 and pulse shaper 362 will operate as described in connection with the manual-mode operation to produce negative EOC pulses on one input line to NAND gate 364, and hence transfer pulses will be produced under these conditions; however, when the numbers remain the same or decrease in algebraic value, the output of pulse shaper 362 to NAND gate 364 is a constant high value which does not in itself produce any transfer pulse, and the maximum number is therefore held in the display. The apparatus brought into play by operation of the mode switch to the "automatic" position senses when a decrease in number value from a maximum occurs and, after a pre-set delay, applies a negative-going pulse over line 400 to an input to NAND gate 364 to produce a transfer pulse and thus release the previous maximum number from the display device. In this example of roller bearing thickness-measurement, the delay may be set at several seconds to permit reading of the maximum number in the display, after which the maximum number will be removed automatically by the transfer pulse and the apparatus automatically readied for measurement of the next bearing.

Referring now in further detail to the operation in the automatic mode, it is noted that AND gate 316 is supplied at its input terminals with the EOC pulses on line 314, with the signal on line 150 indicating that the output of A/D converter is smaller than the preceding number in the display, and with the signal indicating a positive polarity of number on line 146. Accordingly AND gate 316 will transmit the EOC pulse only when the A/D number output is positive and smaller than that transferred to the display immediately previously. This condition corresponds to a decrease in thickness of the measured portion of the specimen. Under these conditions the EOC pulse will act through AND gate 316 and OR gate 420 to produce a negative-going pulse on normally-high line 424.

AND gate 320 is supplied at its input not only with the EOC pulse on line 318, but also with the negative polarity signal on line 370 and with the signal on line 148 which becomes high when the output of the A/D converter exceeds the output of the storage registers produced by the preceding number. A high on all three of these lines also represents a condition in which the thickness of the specimen is decreasing between successive measurements, and will permit the EOC signal to act through AND gate 320 and OR gate 420 and produce a negative-going EOC pulse on line 424. Thus whenever there is a decrease in the successive thickness measurements, a negative-going EOC pulse will appear on line 424 and be applied to a control input of a bistable flip-flop 430.

Flip-flop 430 responds to the input signal on line 424 to switch from its normal to its alternate stable state, this transition between the normal and alternate state producing an output on flip-flop output line 432 which is used to start operation of the timer 434. Timer 434 may be of a known conventional form, employing in this example a capacitor 436 in series with a diode rectifier 438, with a fixed resistor 440 and a variable resistor 442 in series with each other across the capacitor. Resistor 442 constitutes the hold control 134, the setting of which determines the timer interval required for the timer 434 to time out, which typically is adjustable in a range of about one to seven seconds. Upon the end of the time-out interval, timer 434 supplies a pulse over line 450 to a control input of bistable flip-flop 414 to change it from its normal to its alternate state. When flip-flop 414 is in its alternate state, the output voltage thereof produces a high on input line 412 to NAND gate 324. The next subsequent EOC pulse on line 322 is then able to pass through the NAND gate 324 and the shaper and gate 404 to produce a negative-going pulse on line 400. This operates the NAND gate 364 to produce a transfer pulse on line 130, thereby to cause transfer of the next-occurring number from the A/D converter into the display device. The negative output pulse on line 400 from the shaper and gate 404 is also applied over line 460 as a reset to both of the flip-flops 414 and 430, returning them to their original normal states.

In the automatic mode then, so long as the algebraic value of the number from the A/D converter is increasing corresponding to increases in thickness of the specimen, the display device will follow these changes; however, when this reading or number decreases, no EOC pulse is transmitted to the transfer line until the timer has timed out, so that the maximum reading is retained for the duration of the timing interval.

The normal mode of operation is suited for many general purposes, such as exploring the thickness contours of any specimen. The manual mode is particularly useful for individual investigations of the maximum thickness of objects, such as the diameters of objects of circular cross-section or the like, and is also especially useful for experimental purposes. The automatic mode is especially useful in production operations where a specimen, such as a roller bearing or ball bearing, may be rolled beneath the probe and the deviation of the diameter thereof from a standard accurately displayed promptly in digital form without requiring any laborious searching for the position of maximum thickness; the diameter measurement is automatically retained on the display for a convenient interval, permitting ready observation by the operator, after which, when the timing interval is expired, the next subsequent bearing may be passed beneath the probe. This constitutes a highly effective and reliable test procedure for checking whether the diameters of roller bearings or similar objects are within tolerance, with very little possibility of error and without requiring any special skill of the operator.

It will be understood that the particular forms of circuitry utilized in the invention may take many forms, and that a large variety of commercial devices and circuits are available for performing similar functions. Similarly, the apparatus for deriving an initial analog signal may take any of a large variety of forms, including many commercially available devices; such devices need not actually contact the surface of the specimen, but may for example use capacitive or magnetic sensing to provide continuous measurements of specimen thickness as the specimen moves beneath the sensing device. Further, the invention may readily be used to display and hold numbers representing minima in dimensions, rather than maxima; this may in fact be readily done by appropriately interchanging the + polarity line 152 and the − polarity line 370, and if desired a switch may be incorporated to enable whichever of these two types of operation is desired.

Accordingly, while the invention has been described with particular regard to specific embodiments thereof in the interest of complete definiteness, it will be understood that it may be embodied in any of a variety of diverse forms differing substantially from those shown and described, without departing from the spirit and scope of the invention as defined by the appended claims.

We claim:

1. Apparatus for measuring, and for producing indications of, an extreme value of a dimension of an object, comprising:
   dimension-measuring means for scanning a dimension of at least a portion of said object to produce dimension-representing signals representative of successive values of said dimension as said object is being scanned;
   electrical means responsive to said signals for producing a digital display of a number representing an extreme value of said dimension encountered during said scanning;
   said electrical means comprising hold means for retaining said digital display of said number for a display time sufficiently long for ready visual reading thereof, and timing means for automatically resetting said electrical means at the end of said display time to terminate said display of said number and to prepare said electrical means for similar measuring of said extreme value of a next subsequent object.

2. The apparatus of claim 1, in which said dimension-measuring means comprises means for producing said dimension-representing signals while said object is moving through said dimension-measuring means.

3. The apparatus of claim 1, in which said dimension-measuring means comprises electromechanical transducer means having a slidable element spring-biased to bear against the surface of said object a dimension of which is to be measured, said transducer means producing output electrical signals in proportion to the position of said element.

4. The apparatus of claim 1, comprising manually-adjustable means for controllably setting the duration of said display time to a value less than the interval between said measuring of said object and said measuring of a next subsequent object.

5. The method of sensing and displaying an extreme value of a dimension of an object by means of a measuring station having a measuring axis along which it measures said dimension of said object at said station, comprising scanning said object progressively as it moves through said station to produce signals representative of the value of said measured dimension for successive different portions of said object, generating from said signals, and displaying, a digital decimal number representative of said signals and of said measured dimension of said successive portions of said object when said measured dimension is changing toward said extreme value, holding constant said displayed number for a predetermined time interval whenever said measured dimension ceases to change toward said extreme value, and automatically discontinuing said holding constant of said displayed number at the end of said predetermined time interval.

6. The method of claim 5, in which said object has a substantially round cross-section along said axis.

* * * * *